United States Patent

Major et al.

[11] Patent Number: 6,013,116
[45] Date of Patent: Jan. 11, 2000

[54] BRIQUETTE BINDER COMPOSITION

[76] Inventors: Billy Joseph Major, 239 Russel Street, P.O. Box 2559, Sturgeon Falls, Ontario, Canada, P0H 2G0; George Radu, 3405 Beaulieu Street, Brossard, Quebec, Canada, J4Z 2P8

[21] Appl. No.: 09/132,506

[22] Filed: Aug. 11, 1998

[30] Foreign Application Priority Data

Feb. 2, 1998 [CA] Canada ................................. 2222190

[51] Int. Cl.[7] .................................................... C10L 5/40
[52] U.S. Cl. ................................................ 44/551; 44/578
[58] Field of Search ....................................... 44/551, 578

[56] References Cited

U.S. PATENT DOCUMENTS

| | | |
|---|---|---|
| 3,725,034 | 4/1973 | Joseph et al. . |
| 3,898,076 | 8/1975 | Ranke . |
| 3,954,553 | 5/1976 | Dillard et al. . |
| 4,152,119 | 5/1979 | Schulz .................................... 44/578 |
| 4,507,172 | 3/1985 | Steltenkamp ...................... 162/30.11 |
| 4,589,887 | 5/1986 | Aunsholt . |
| 4,597,790 | 7/1986 | Matsui et al. . |
| 4,659,374 | 4/1987 | Alanko et al. . |
| 4,698,067 | 10/1987 | Finley et al. . |
| 4,741,376 | 5/1988 | Landqvist et al. . |
| 5,034,094 | 7/1991 | Kurple .................................... 162/16 |
| 5,080,756 | 1/1992 | Kutney . |
| 5,221,290 | 6/1993 | Dell . |
| 5,264,007 | 11/1993 | Lask . |
| 5,302,341 | 4/1994 | Palowitz et al. . |
| 5,431,702 | 7/1995 | Schulz .................................... 44/578 |
| 5,522,958 | 6/1996 | Li . |
| 5,714,184 | 2/1998 | Major .................................... 426/74 |
| 5,797,972 | 8/1998 | Schulz .................................... 44/578 |

FOREIGN PATENT DOCUMENTS 1042159  11/1978  Canada .

*Primary Examiner*—Jacqueline V. Howard
*Attorney, Agent, or Firm*—Evenson, McKeown, Edwards & Lenahan, P.L.L.C.

[57] ABSTRACT

A binder composition for use in forming briquettes is disclosed. The composition comprises from about 5 to about 95% asphalt base and about 5 to about 95% sodium carbonate pulping liquor by weight. The binder composition may contain up to about 3% by weight of a surfactant, such as nonyl phenol ethoxylate, to increase homogeneity of briquette formation. Strength increasing additives such as latex, vinyl derivatives, cellulose, cellulose derivatives, peat moss, starch, starch derivatives, pulp from the pulp and paper industry, paper, cardboad, acrylic copolymers and combinations thereof, may be added to the binder composition in a total amount of up to about 10% by weight. Lignosulfonate may be added to the composition in an amount of up to about 30% by weight. An inorganic component such as cement or bentonite clay may be added in an amount of up to about 70% by weight, and up to about 30% by weight of a plasticizer such as rubber or plastic may be added. The binder composition may be used to agglomerate a briquette filler such as metal fines, coal fines, miniers, fly ash or other suitable briquette components.

26 Claims, 2 Drawing Sheets

BRIQUETTE BINDER COMPOSITION

The invention relates to a binder composition for use in briquette formation, and to briquettes formed using such a binder.

BACKGROUND OF THE INVENTION

Briquettes are conventionally made by agglomerating briquette filler with a binder. Briquette fillers include stock fines, such as metal fines and coal fines, minerals, fly ash or other material which may be finely divided and suitable as a briquette component. Recyclable materials such as metal scrap and organic waste, such as municipal sewage sludge, waste paper, etc. have also been used as briquette filler. Asphalt, tar-pitch, cement, starch, starch molasses, molasses, lime molasses, latex, and lignosulfonates have been used as binders in conventional briquette compositions.

U.S. Pat. No. 3,898,076 (Ranke, 1975) teaches the use of paraffin wax and a vinyl copolymer as a binder to agglomerate briquette filler. Solid organic biomass is used as a briquette filler and fly ash coke as a binder in fuel briquettes formed according to U.S. Pat. No. 4,589,887 (Aunsholt, 1986). U.S. Pat. No. 4,597,790 (Matsui et al., 1986) describes agglomerates formed from iron ore fines or iron sand as a filler with cement or granulated blast furnace slag as a binder, U.S. Pat. No. 5,221,290 (Dell, 1993) describes charcoal briquettes bound with an organic binder and a water-swellable smectite clay. U.S. Pat. No. 5,264,007 (Lask, 1993) teaches the agglomeration of caking coke and finely-divided limestone as briquette filler, using pitch and coal as a binder. U.S. Pat. No. 5,431,702 (Schulz, 1995) describes a method for making fuel briquettes using dewatered sewage sludge, and cellulosic waste such as paper as briquette filler mixed with a conventional binder.

Pitch and bituminous substances, such as asphalt, are common binding agents used in conventional processes of briquette formation, such as those described in U.S. Pat. Nos. 3,725,034 (Joseph et al., 1973); 4,698,067 (Finley et al., 1987); and 5,264,007 (Lask, 1993). Asphalt is a semisolid black substance comprising bitumen and inert matter, and is obtained as a residue of petroleum distillation. Coaltar pitch is the residue left by the distillation of coal tar, and comprises a mixture of hydrocarbons and finely divided carbon. Coal tar pitch is also used for lowering dust levels on road surfaces, and for carbon electrodes.

The use of asphalt, coal tar pitch or petroleum pitch in a binder system in combination with lignosulfonates is known. For example, U.S. Pat. No. 4,659,374 (Alanko et al.) teaches the use of asphalt or pitch as a primary binder, and lignosulfonate salts, carbohydrates or silicates as a secondary binder in a mixed binder system for use in forming agglomerates.

Lignosulfonates can be derived from the pulping process, and contain high sulfur levels. Use of lignosulfonate, either alone or in combination with asphalt, as a briquette binder, leads to a product that may not be adequately water-proof, and is thus susceptible to degradation upon moisture absorption if, for example, exposed to rain. Thus, it is desirable to formulate a binder in which lignosulfonate levels may be reduced or eliminated, thereby lowering the sulfuir content due to lignosulfonate.

Heat curing with high heat, generally in excess of 100° C., is used during conventional curing processes to strengthen the briquette. U.S. Pat. Nos. 3,725,034 (Joseph et al., 1973); 5,264,007 (Lask, 1993); and 5,302,341 (Palowitz et al., 1994), describe processes for briquette formation which include heat curing with high heat. The heat curing process provides conventional briquettes with water resistance but also adds to the expense of briquette formation. It is desirable to formulate a binder composition which does not require high heat curing for briquette formation, but which still maintains adequate water resistance.

SUMMARY OF THE INVENTION

According to the invention there is provided a binder composition for use in briquette formation which comprises pulping liquor. Furthermore, this invention embraces binder compositions for use in briquette formation comprising pulping liquor and optionally up to about 99% asphalt base by weight.

Additionally, according to the invention, there is provided a briquette comprising briquette filler and a binder according to the invention, wherein the binder is present in an amount of from about 1 to about 30% by weight, preferably from about 2 to about 20% by weight, and more preferably at a level of about 6% by weight. The solids content of the pulping liquor may range from about 25% to about 100% by weight.

Further, the invention provides a process for preparing briquettes comprising the steps of: (i) combining briquette filler with about 1 to about 30% by weight of a binder composition, wherein the binder composition comprises pulping liquor and from about 1 to about 99% asphalt base by weight, and (ii) compressing the product of step (i) into briquettes.

An advantage of the binder composition is that it only needs a low temperature or even ambient temperatures for curing, thereby eliminating the need for heat curing with high heat during briquette formation. Thus, the binder composition produces a strong and waterproof briquette without high heat curing.

A further advantage of the binder composition is that the sulfur content associated with conventional lignosulfonate-based binders may be reduced by replacing lignosulfonates completely or in part with a sulfur-free pulping liquor, such as sodium carbonate pulping liquor.

A further benefit of the invention is that it provides a use for the pulping liquor produced as a waste product of the pulp and paper industry. Currently, pulping liquor is either burned as fuel or dumped on municipal roads as a dust suppressant.

BRIEF DESCRIPTION OF THE DRAWINGS

Features of the invention will be apparent from the following description in which reference is made to the appended drawings wherein.

DESCRIPTION OF PREFERRED EMBODIMENTS

Figure 1:
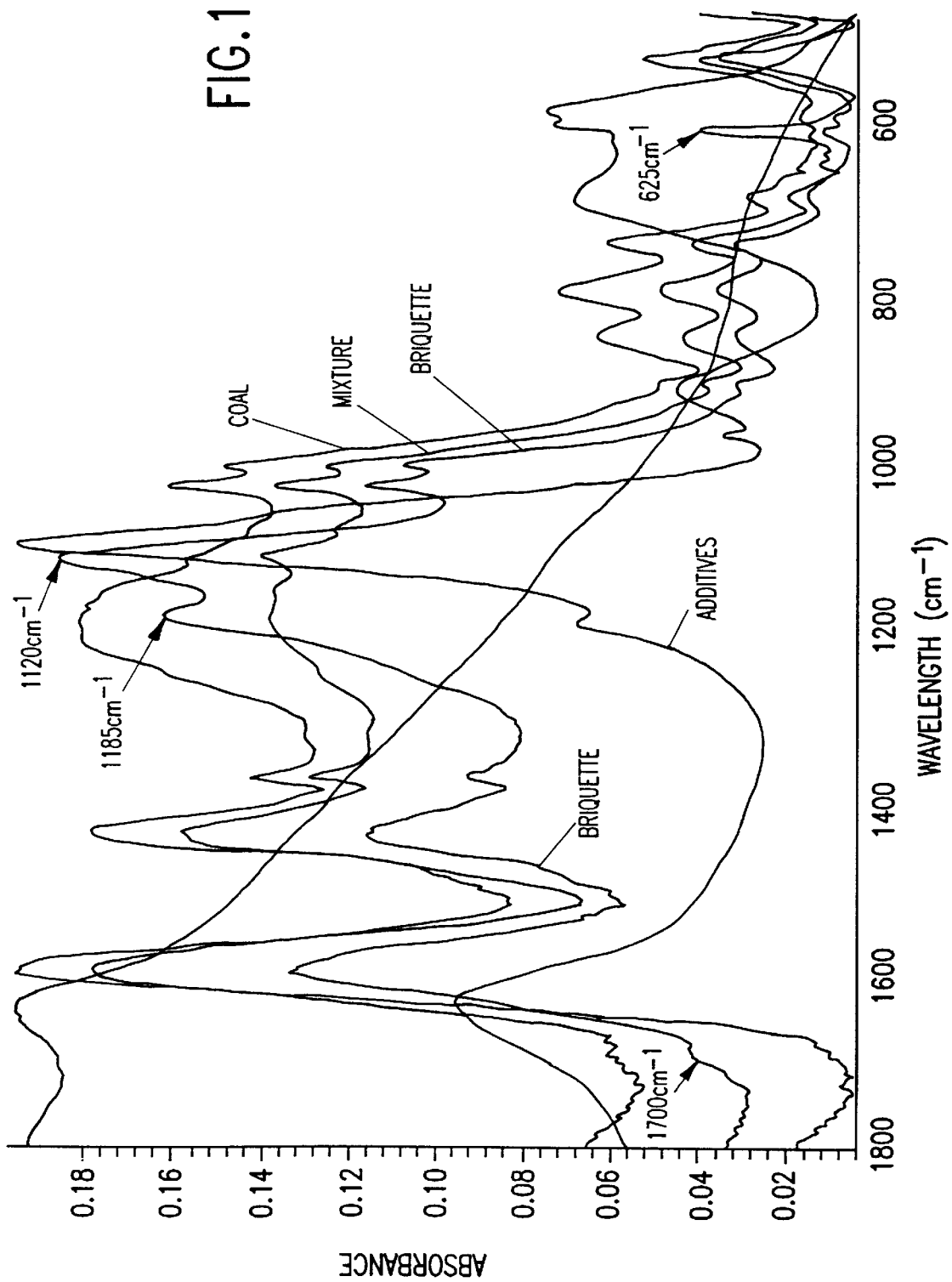
FIG. 1 is a plot of the Fourier transform infrared (FT-i.r.) spectra of briquette components according to an embodiment of the invention.

The pulping liquor used in the binder composition of the present invention is preferably obtained from the sodium carbonate pulping process, but may also be obtained from the kraft pulping process, or other known alkali pulping operations in use in the pulp and paper industry.

The process of sodium carbonate semi-chemical pulping was developed in response to the desire to reduce the sulfuric pollution arising from the kraft pulping process. Sodium carbonate pulping liquor is the spent liquor from sulfur-free sodium carbonate semi-chemical pulping processes. Sodium carbonate pulping liquor is produced by cooking wood chips in the presence of an aqueous $Na_2CO_3$ solution and compressing and separating the wood fibers from soluble components.

A variety of process conditions can be employed for preparation of sodium carbonate pulping liquor, such as those outlined in Canadian Patent No. 1,042,159 (Temler, 1978). In general, hardwoods may be pulped by steaming with a sodium carbonate solution at a concentration of about 65 to about 120 g/L when expressed as $Na_2O$. The temperature may range from about 170 to about 200° C., to yield about 70 to about 80% pulp. The spent liquor is separated, and digested chips are then converted to pulp.

Sodium carbonate semi-chemical pulping processes also include processes which use a combination of sodium carbonate and sodium hydroxide, such as the process outlined in U.S. Pat. No. 3,954,553 (Dillard et al., 1976). The process pulps hardwood in an aqueous solution of about 15 to about 50% NaOH and about 50 to about 85% $Na_2CO_3$, (both chemicals expressed as $Na_2O$). The pulping cycle may be brief, such as 4 minutes at 191° C. or may be extended, such as heating up to 171° C. over 50 minutes and maintaining this temperature for 45 minutes.

Thus, production of sodium carbonate pulping liquor may occur using a pulping cycle ranging form about 4 minutes to about 95 minutes at temperatures ranging from about 171 to about 191° C.

According to one particular method of sodium carbonate semi-chemical pulping, wood chips are steamed at a pressure of about 1100 kPa in the presence of a mild sodium carbonate ($Na_2CO_3$) solution (about 115 g $Na_2CO_3$/L) for about 14 minutes, thereby softening the wood chips. Softened wood chips are then separated into individual fibers during a refining stage. Wood chip fibers are then compressed to separate spent sodium carbonate liquor from wood chip fibers. The water content of the separated spent sodium carbonate liquor is reduced by evaporation to produce a solution of from about 25% to about 65% solids by weight. As an example, sodium carbonate pulping liquor may be used as a 45% solids solution, but any suitable solution may also be used. A dry (powdered) form of sodium carbonate pulping liquor may also be used, having a negligible water content. If a dry form of pulping liquor is used, an appropriate solvent may be mixed therewith when formulating the binder or the briquettes, to ensure adequate coating of the briquette filler with the binder composition in the agglomeration process.

The sodium carbonate and sodium carbonate-hydroxide semi-chemical pulping processes are described in further detail in *Pulp & Paper Manufacture: Sulfite Science and Technology* (3rd Ed., Vol. 4), Ingruber, Kocuret & Wong Eds.; The Joint Textbook Committee of the Paper Industry, Oxbury, ON, Canada; pages 152 to 155.

Sodium carbonate pulping liquor comprises a mixture of one or more components from the group consisting of short-chain carboxylates, polysaceharides, lignin, lignin breakdown products, and sodium hydroxide, if sodium hydroxide is used in the pulping process as described above. Sodium carbonate pulping liquor is sulfur-free The composition of the liquor depends on the type of wood used and the specific processing conditions employed during the pulping process, Kraft pulping liquor may be obtained through conventional kraft pulping processes, such as those described in U.S. Pat. Nos. 4,741,376 (Landqvist et al., 1988); 5,080,756 (Kutney, 1992); and 5,522,958 (Li, 1996).

Pulping liquor for use with the invention may be in a liquid, slurry, or powder form, having a solids content ranging from about 25% to about 100% by weight. The liquid form of pulping liquor may be dried to reduce moisture content using any suitable method, such as evaporation, spray drying or heat. Spray drying is a process of suspended particle processing; other such suspended particle processing methods such as fluid-bed drying, flash drying, spray granulation, spray agglomeration, spray reaction, spray cooling, and spray absorption, may also be employed to increase the solids content of the pulping liquor. Spray drying, for example, dehydrates the sodium carbonate pulping liquor into a fee flowing powder form having a solids content of about 94% to about 96% by weight.

The asphalt base used in the binder may expediently be a liquid petroleum product or asphalt cut-back produced by fluxing an asphaltic base with a suitable distillate, for example, a petroleum distillate such as napta. Asphalt cut-back is a composition of asphalt diluted with mineral spirits or other appropriate diluent, and may include hydrogen sulfide. The asphalt base may be any typical type of asphalt or a combination of types, such as petroleum asphalt, Trinidad pitch, mineral pitch, or any suitable asphalt mixture comprised of hydrocarbon and heterocyclic compounds having sulfur, nitrogen and oxygen. The asphalt base may be a rapid cure asphalt.

A surfactant such as nonyl phenol ethoxylate may be present in the binder composition. The surfactant may be present in the binder at a level of up to about 3% by weight. The nonyl phenol ethoxylate may be formed by ethoxylation of nonyl phenol with ethylene oxide at a level of between about 4 and about 9 moles ethylene oxide per mole of nonyl phenol, and preferably at a level of about 6 moles per mole of nonyl phenol.

The pulping liquor present in the binder composition according to the invention may replace all or some of the lignosulfonate used in a conventional binder composition, thereby lowering the level of sulfur in a binder composition. However, lignosulfonates need not be completely removed from the binder composition according to the invention, Lignosulfonates such as sodium lgnosulfonate, ammonium lignosulfonate, or calcium lignosulfonate or a mixture thereof, may be included in the binder composition at a level of up to about 30% by weight. For example, lignosulfonate may be present in the binder composition at a level of about 25% by weight, and in an approximate 1:1 ratio with the pulping liquor.

Strength increasing additives may be added to the binder composition to an amount of up to about 10% by weight. Suitable strength increasing additives include latex, vinyl derivatives, cellulose, cellulose derivatives, peat moss, starch, starch derivatives, pulp from the pulp and paper industry, paper, cardboard, acrylic copolymers, and combinations thereof. Paper and cardboard may be derived from a recycled source.

Latex may be natural or synthetic latex product. Vinyl derivatives may include polyvinyl acetate, polyvinyl alcohol, or any other suitable derivative. Cellulose derivatives include carboxymethyl cellulose, hydroxy ethyl cellulose, or any other suitable derivative. An acrylic copolymer, for example, which is not to be considered limiting in any manner, Nacrylic™ 6408 produced by NACAN (60 West Dr. Brampton, Ontario Canada), may be used.

A plasticizer such as rubber or plastic may be added to the binder at a level of up to about 20% by weight. Expediently, the plastic of rubber may be from a recycled source. The plasticizer serves to improve the adherence and plasticity of the briquettes made from the binder.

Inorganic components may be added to the binder composition. Such components include bentonite or other types of clay, and cement. Inorganic components may be present in the binder composition at a level of up to about 70% by weight.

Thus the binder composition of the present invention contains pulping liquor, for example binder compositions may contain from about 1 to about 99% pulping liquor, from about 1 to about 99% asphalt, up to about 30% lignosulfonate, up to about 3% surfactant, up to about 10% of a strength increasing additive, up to about 30% of a plasticizer, and up to about 70% of an inorganic component by weight. The solids content of the sodium carbonate pulping liquor may range from about 25 to about 100% by weight, preferably from about 35 to about 65% by weight, and more preferably, for example without being limiting, a suitable solids content of about 45% by weight may be used. A formulation for the binder composition is about 50% sodium carbonate pulping liquor (45% solids) and about 50% asphalt by weight.

If the surfactant nonyl phenol ethoxylate is included in a binder composition according to the invention, it is preferably present at a level of about 2% along with about 49% sodium carbonate pulping liquor and about 49% asphalt by weight. According to another embodiment of the binder composition, about 65% sodium carbonate pulping liquor and about 35% asphalt may be used. If lignosulfonate is included, an example of a binder formulation according to the invention which is not to be considered limiting in any manner, would be about 25% lignosulfonate, about 25% sodium carbonate pulping liquor and about 50% asphalt by weight.

Briquette fillers for use in the invention include but are not limited to stock fines, such as metal fines, charcoal, coal fines, iron ore fines, iron sand, minerals, fly ash, caking coke, finely divided limestone, or other material which may be finely divided and suitable as a briquette component. Recyclable materials such as metal scrap and organic waste, organic biomass, municipal sewage sludge, dewatered sewage sludge, waste paper, cellulosic waste, etc. can be used as briquette filler.

Briquettes may be formulated by combining from about 1 to about 30% of a binder according to the invention with briquette filler. Preferably, the binder is present at a level of from about 2 to about 20%, and more preferably at a level of about 6%. For example, briquettes may be formed using about 93% briquette filler and about 7% binder composition by weight.

To form briquettes, the binder composition ingredients are combined to form a homogeneous mixture. The appropriate quantity of binder composition is then added to a briquette filler and mixed well before being agglomerated into a briquette in a conventional turbulator, or using a conventional press or pan. Briquettes may be formed via a disc pelletizing process. Disc pelletizing is a process used for agglomerating finely briquette filler into briquettes, typically in the form of pellets or balls. The particles of finely divided briquette filler material are coated with the binder composition, and compacted mechanically by rolling down the surface of a disc pan, or other balling devices. Briquetting machines such as roll type briquetters may also be used to produce briquettes of various shapes and sizes by applying pressure to briquette filler coated with the binder composition. Optionally, the briquettes of the present invention may be cured with heat if desired. Suitable methods for heat curing are disclosed in U.S. patent applications Ser. Nos. 3,725,043, 5,264,007 or 5,302,341.

When forming briquettes using the binder composition of the present invention, an acidifying agent may be added to the binder composition and the briquette filler in an amount of up to about 3% by weight of the total briquette composition. Acidifing agents may be a full-strength or diluted solution of an inorganic acid such as hydrochloric acid, phosphoric acid or sulfuir acid which may be in liquid form, or an organic acid such as citric acid or sulfuric acid which may be in crystalline or powder form.

A homopolymer, such as polyethylene oxide homopolymer, may be added to the briquette composition in an amount of up to about 15% by weight of the total briquette composition. Without wishing to be bound by theory, the addition of the homopolymer to the briquette composition is thought to result in a chemical change within constituents of the briquette due to the unshared electron present in the homopolymer which forms hydrogen bonds with lignin present in the pulping liquor. As a result of this hydrogen bond formation, the strength of the binder, for example the wet strength, increases. Furthermore, the addition of such a homopolymer to briquette compositions will result in a chemical change of the briquette-binder compositions.

Briquettes may be formulated by combining from about 1 to about 30% of a binder according to the invention with briquette filler, and optionally with up to about 3% of an acidifying agent, and up to about 2% of a homopolymer. Preferably, the binder is present at a level of from about 2 to about 20%, and more preferably at a level of about 6%. For example, briquettes may comprise about 90% briquette filler, about 5% binder composition, about 2% by weight of an aqueous about 50% hydrochloric acid (38%) solution, (resulting in 2% of a 19% solution of HCl) and about 2% by weight of an aqueous solution having 0.25% polyethylene oxide.

The following examples illustrate the invention, but are not to be considered limiting.

EXAMPLES

Tests were conducted on briquettes formed by pelleting carbon fines with the binder composition of the present invention. The formulations of the binder composition tested is outlined below as Binder Composition 1. Briquettes tested were formulated as outline below as Briquette Compositions 1 and 2. Where comparative tests were conducted, Comparative Binder Composition 1 and Comparative Briquette Composition 1 were used. Tests were conducted to determine if chemical alterations were induced in the starting materials during the pelleting process, and to characterize the chemical and physical properties of the briquettes.

Binder Composition 1

50% sodium carbonate pulping liquor and 50% asphalt by weight.

Comparative Binder Composition 1

50% lignosulfonate and 50% asphalt by weight.

Briquette Composition 1

50 g coal fines, 3.5 g Binder Composition 1, 1 g of an aqueous solution of 50% hydrochloric acid (38%), and 1 g of an aqueous solution of 0.25% polyethylene oxide homopolymer (about 90% coal fines and 6.3% binder by weight).

Briquette Composition 2

50 g coal fines and 3.5 g Binder Composition I (about 93% coal fines and 7% binder by weight).

Comparative Briquette Composition 1

50 g coal fines and 3.5 g Comparative Binder Composition 1 (about 93% coal fines and 7% binder by weight).

Tests conducted include Fourier transform infrared (FT-i.r.) spectroscopy, bulk chemical analysis for such parameters as volatile matter, fixed carbon, moisture, and ash, ultimate analysis, KaI-Fisher water content, calorific (Cating) value, and compressive strength. As shown in FIG. 1 and Table 1, tests were conducted on a combination of briquette additives (ADDITIVES), which includes Binder Composition 1 (BINDER); an aqueous solution of 50% hydrochloric acid (ACID); and an aqueous solution of 0.25% polyethylene oxide homopolymer (POLYMER) in a weight ratio of 7:2:2. Coal fines (COAL) and briquettes formed in accordance with Briquette Composition 1 (BRIQUETTE) were also tested.

A sample of the briquette mixture in non-briquette form (MIXTURE) was also tested to identify differences which may be induced during briquette formation. The blended non-briquette form mixture was stored in a sealed glass container to avoid moisture loss.

Fourier Transform Infrared Spectroscopy (FT-i.r.) Analysis

Infrared spectroscopy identifies changes in the molecular bonding of organic matrices. Absorption of infrared radiation occurs when the frequency of vibration of two atoms having a common covalent or hydrogen bond, corresponds to the frequency of the radiation with which the sample is irradiated. The frequency at which a pair of bonded atoms oscillate is determined primarily by the identity of the atoms and by their bonding environment, such as neighboring atom or groups to which they are attached. An infrared spectrum can provide precise qualitative and semi-quantitative information on the nature of the molecular bonding within a given sample. FT-i.r. is primarily sensitive to absorption by organic components and is less sensitive to absorption by inorganic components, although still usefull.

FT-i.r. spectra were obtained using a Nicolet Model 20-SXC spectrometer. Four samples were analysed, namely ADDITIVES, COAL, MIXTURE, and BRIQUETTE, as defined above. Prior to analysis, solid BRIQUTETTE samples were crushed and reduced to approximately minus 60 mesh particle size by grinding in a mortar and pestle. All samples were agitated vigorously prior to sampling to ensure a representative mixture was obtained. An aliquot of each sample was blended for 2 minutes in a ball mill with infra-red grade KBr in a ratio of approximately 1:99 sample::KBr. Pressed KBr pellets were prepared for each sample/KBr blend. A blank KBr pellet was used to determine a background spectrum. Transmittance-mode scans were obtained.

FIG. 1 shows overlays of FT-i.r. spectra obtained for ADDITIVES, COAL, MIXTURE, and BRIQUETTE samples, as defined above. The spectral region from about 1,800 to 550 $cm^{-1}$ is expanded in FIG. 1 to facilitate spectral interpretation.

The tests reveal that chemical differences exist between the briquette and the starting materials. Differences were most apparent in the FT-i.r. spects, with additional indications of alteration provided by the proximate analysis. Four absorption bands in the spectrum of BRIQUETTE were either absent or of substantially lower intensity in the spectra of ADDITIVES and MIXTURE. These four absorption bands, distinctive of the spectrum derived for BRIQUETTE, are shown in FIG. 1 at about 1700 $cm^{-1}$, 1185 $cm^{-1}$, 1120 $cm^{-1}$, and 625 $cm^{-1}$.

The absorption band at 1700 $cm^{-1}$ is attributable to absorption by carbonyl functional groups, thus indicating changes in carbonyl structure within the BRIQUETTE sample. Although this absorption band is indicative of a relatively minor alteration, it does demonstrate oxidation. This absorption band is also apparent in the spectrum of the MIXTURE and in the spectrum of the ADDITIVES. However, considering that the ADDITIVES is a minor component of the MIXTURE and the BRIQUETTE samples, the absorption band observed in the BRIQUETTE sample cannot be fully attributable to the ADDITIVES without a further chemical interaction.

The next two spectral bands at 1185 $cm^{-1}$ and 1120 $cm^{-1}$, distinctive to the BRIQUETTE sample, are indicative of alterations of covalent carbon-oxygen bonds through absorption by inorganic species. The COAL sample also exhibits an absorption band in the 1185 $cm^{-1}$ region. However, the shape of this peak for COAL is different from that of BRIQUETTE, suggesting a more crystalline-like (uniform bonding) matrix was formed in the BRIQUETTE sample, potentially due to the pressure applied during briquetting. Although the ADDITIVES sample also exhibits a minor absorption band at 1185 $cm^{-1}$, it is only a minor component of the BRIQUETTE sample, and cannot filly account for the peak in the BRIQUETTE sample without an accompanying chemical interaction among components.

The 1120 $cm^{-1}$ absorption peak in the BRIQUETTE spectrum is clearly distinct from the absorption bands of the other samples shown in FIG. 1, except the MIXTURE, which absorbs at this frequency with less intensity. The ADDITIVES sample displays an absorption band at 1100 $cm^{-1}$ which has a 20 $cm^{-1}$ shift as compared to the absorption band in the BRIQUETTE and MIXTURE samples shown at 1120 $cm^{-1}$.

The absorption band at about 625 $cm^{-1}$ is unique to the BRIQUETTE sample. The nature of the bonds responsible for absorption are unclear, but the presence of this absorption peak in the BRIQUETTE sample alone, indicates that chemical changes occur as a result of the briquetting process.

Spectral differences between the BRIQUETTE the non-briquetted MIXTURE and the starting materials, ADDITIVES and COAL, indicate that chemical interaction occurred between the coal fines, the binder components, and other additives either during or after the mixing and briquetting processes.

Bulk Chemical, Proximate, Ultimate, and Calorific-Value Analysis

Measurement of adsorbed moisture, fixed carbon, volatile matter and ash (proximate), Karl-Fisher moisture, CHNS (ultimate) and calorific value (BTU) were made according to ASTM standard methods which were developed for coal analysis, with the exception of Karl-Fisher moisture. Proximate analyses were conducted according to ASTM-D5142. Water content was determined for three liquid samples by Karl-Fisher titration (ASTM-E203). Ultimate analyses were conducted according to ASTM-D5373 (CHN) and -D4239 (S). Gross calorfic value was determined by an Isoperibol-bomb calorimeter according to ASTM-D5865.

Analyses were carried out on the BRIQUETTE, MIXTURE, COAL, BINDER, ACID, and POLYMER samples, defined above. Results from chemical analyses are shown in Table 1. The reduced water content of the BRIQUETTE sample as compared to the MIXTURE and the COAL samples indicates that adsorbed moisture content was lower in the BRIQUETTE than in the COAL or MIXTURE samples. Although the water content of the BINDER, ACID, and POLYMER explains the high water content of the MIXTURE, the BRIQUETTE may be lower in moisture due to the self-curing process. A reduction in moisture content is consistent with water displacemnent by hetero-atom-containing additives which contain polar functional groups that are attracted to and may form weak bonds with the same polar functional groups in the coal matrix as does the adsorbed water.

TABLE 1

Bulk Chemical Proximate, Ultimate, and Calorific-Value Analysis

| Parameter | COAL | BRIQUETTE | MIXTURE | ACID | POLYMER | BINDER |
|---|---|---|---|---|---|---|
| % C | 73.97 | 73.33 | 71.18 | 0.14 | 0.98 | 45.11 |
| % H | 5.15 | 5.14 | 5.56 | 9.23 | 10.94 | 9.75 |
| % N | 1.59 | 1.56 | 1.54 | 0.73 | 1.19 | 1.22 |
| % S | 1.56 | 1.77 | 1.72 | 4.68 | <0.01 | 0.73 |
| % C(dry) | 78.11 | 75.04 | 78.06 | | | 71.84 |
| % H(dry) | 4.82 | 5.00 | 5.02 | | | 8.94 |
| % N(dry) | 1.68 | 1.60 | 1.69 | | | 1.94 |
| % S(dry) | 1.65 | 1.81 | 1.89 | | | 1.16 |
| H/C (dry) | 0.74 | 0.80 | 0.77 | | | 1.49 |
| N/C (dry) | 0.018 | 0.018 | 0.019 | | | 0.023 |
| S/C (dry) | 0.0079 | 0.0091 | | | | 0.0061 |
| Moisture | 5.30 | 2.28 | 8.81 | 84.3 | 98.75 | 37.2 |
| Vol Matter | 38.57 | 38.14 | 36.61 | 8.06 | 2.05 | 53.90 |
| Fixed C | 49.69 | 51.77 | 47.71 | 2.40 | 0.24 | 2.37 |
| Ash | 6.44 | 7.81 | 6.87 | 5.21 | <0.01 | 6.52 |
| BTU | 13179 | 132.17 | 12679 | 1244 | | 10928 |

A reduction in moisture content was also measured in the pellet relative to the coal fines, consistent with possible water displacement by one or more of the binder components. The briquettes also exhibited a slightly higher heating value than the coal fines, attributable to the moisture reduction.

Drop Tests

Drop tests were performed by dropping briquettes from a 1 meter height onto a rubber mat and measuring the number broken briquettes. Briquettes formed from Briquette Composition 2 were dropped following production within about 10 minutes. An acceptable rate of breakage was determined as 10% broken briquettes. Briquettes formed from Briquette Composition 2 were found to have an acceptable breakage rate of less than 10%.

Compressive strength

Compressive strength was measured in briquettes formed from Briquette Composition 2. Four compressive strength tests were performed and the results are shown in Table 2. After formation, the briquettes were left at ambient room temperature (about 22° C.), to cure for at least 7 days.

TABLE 2

Compressive Strength of Briquettes

| Test # | Strength (lb/in$^2$) |
|---|---|
| 1 | 249 |
| 2 | 208 |

TABLE 2-continued

Compressive Strength of Briquettes

| Test # | Strength (lb/in$^2$) |
|---|---|
| 3 | 210 |
| 4 | 224 |
| Average | 223 |

The average compressive strength of 223 lb/in$^2$ was well above the normal adequate level of 20 lb/in$^2$, considered to be adequate for stable storage in a silo 10 ft high. The high values for compressive strength indicate that H-bonding occurred in the briquettes, since H-bonding imparts structural integrity. The compressive strength test indicates that the briquettes formed using the binder composition of the present invention are highly durable.

Water Resistance and Solubility

Water resistance was measured for briquettes formed from Briquette Composition 2, by immersing briquettes in water and comparing residual compressive strength with initial compressive strength (prior to immersion). Briquettes were immersed in water for 7 days and residual compressive strength was measured. A compressive strength of about 75% of the initial strength was observed and determined to be an acceptable level of water resistance.

Water solubility was measured as a percentage of loss of briquette weight over a period of four weeks. Briquettes were formed according to the formulations of Briquette Composition 2 (show as Sample 1 in FIG. 2) and Comparative Briquette Composition 1 (shown as Sample 2 in FIG. 2), and allowed to cure for 7 days at ambient room temperature. Briquettes were then immersed in water and weighed at weekly intervals to observe loss of briquette weight over time.

Figure 2:
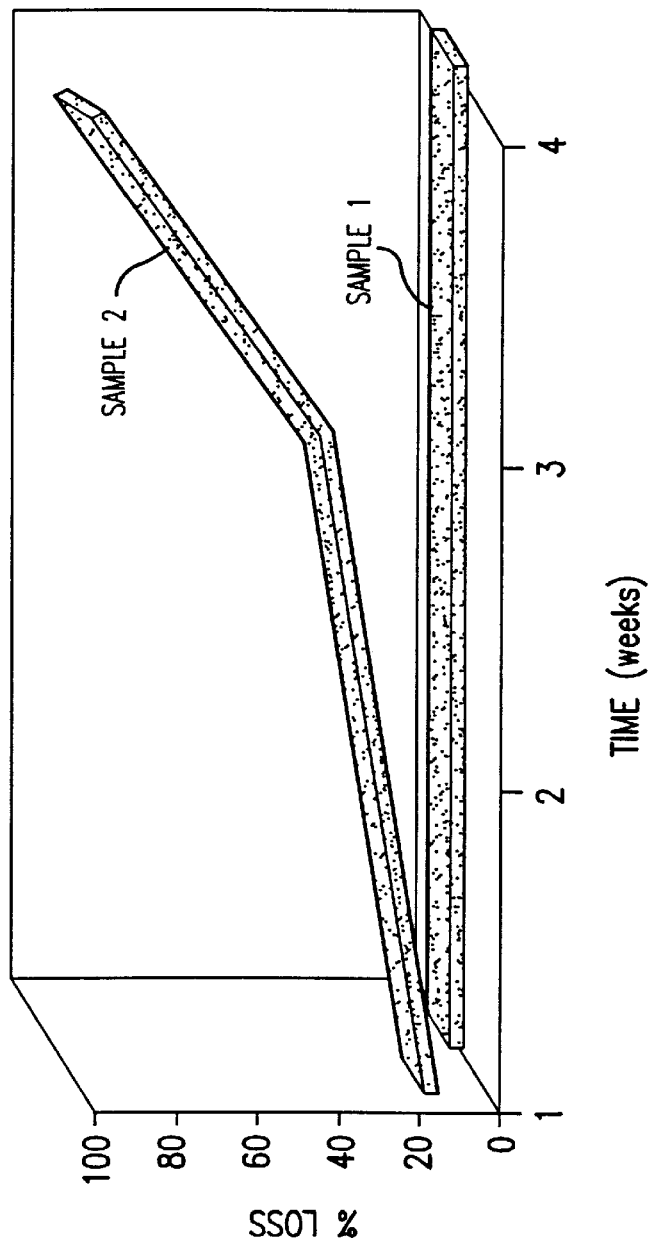
FIG. 2 illustrates the results of comparative water solubility tests conducted on briquettes according to an embodiment of the present invention and a briquette formed according to a prior art formulation.

FIG. 2 shows the water solubility in terms of percent of briquette weight lost over time. After four weeks of immersion in water, the briquettes of the present invention formed according to Briquette Composition 2 lost no detectable weight, and are thus insoluble in water. However, after 4 weeks of water immersion, briquettes formed with a lignosulfonate/asphalt binder according to the formulation of Comparative Briquette Composition 1 were completely (100%) soluble in water. This illustrates that briquettes formed according to the invention provide an advantageous resistance to water solubility over prior art briquette compositions formed with conventional binders.

All references, including scientific publications and patent documents are incorporated herein by reference. The foregoing embodiments illustrate the invention, but should not be considered as limiting. Modifications and equivalents which readily occur to those skilled in the art also fall within the scope of the invention.

We claim:

1. A binder composition comprising up from about 1% to about 99% sodium carbonate pulping liquor by weight and from about 1% to about 99% asphalt base by weight.

2. The binder composition according to claim 1, additionally comprising lignosulfonate in an amount of up to about 30% by weight.

3. The binder composition according to claim 2, wherein the lignosulfonate is selected from the group comprising sodium lignosulfonate, ammonium lignosulfonate, calcium lignosulfonate and combinations thereof.

4. The binder composition according to claim 1, additionally comprising a surfactant.

5. The binder composition according to claim 4, wherein the surfactant is nonyl phenol ethoxylate.

6. The binder composition according to claim 1, additionally comprising a strength increasing additive selected from the group comprising latex, vinyl derivatives, cellulose, cellulose derivatives, peat moss, starch, starch derivatives, pulp from the pulp and paper industry, paper, cardboard, acrylic copolymers, and combinations thereof, in an amount of up to about 10% by weight.

7. The binder composition according to claim 6, wherein the vinyl derivatives are selected from the group consisting of polyvinyl acetate and polyvinyl alcohol.

8. The binder composition according to claim 6, wherein the cellulose derivatives are selected from the group consisting of carboxymethyl cellulose and hydroxy ethyl cellulosed.

9. A binder composition according to claim 1, comprising up to about 30% by weight of a plasticizer selected from the group comprising plastic and rubber.

10. A binder composition according to claim 1, comprising up to about 70% by weight of an inorganic component selected from the group comprising bentonite and cement.

11. A binder composition according to claim 1, comprising about 50% asphalt base and about 50% sodium carbonate pulping liquor by weight.

12. A binder composition according to claim 1, comprising about 35% asphalt base and about 65% sodium carbonate pulping liquor by weight.

13. A binder composition according to claim 1, wherein the solids content of the pulping liquor is from about 25 to about 100% by weight.

14. A binder composition comprising from about 1 to about 99% pulping liquor by weight, from about 1 to about 99% asphalt base by weight, up to about 30% lignosulfonate by weight, up to about 3% surfactant by weight, up to about 10% of a strength increasing additive by weight, up to about 30% of a plasticizer by weight, and up to about 70% of an inorganic component by weight.

15. A briquette comprising briquette filler and the binder composition according to claim 1.

16. The briquette according to claim 15, wherein the binder composition is present in an amount of from about 1 to about 30% by weight of the briquette.

17. The briquette according to claim 15, wherein the binder composition is present in an amount of from about 2 to about 20% by weight of the briquette.

18. The briquette according to claim 15, wherein said binder composition comprises sodium carbonate pulping liquor having a solids content of from about 25% to about 100% by weight.

19. The briquette according to claim 15, additionally comprising up to about 3% of an acidifying agent by weight.

20. The briquette according to claim 15, additionally comprising a homopolymer.

21. A briquette comprising about 1% to about 30% by weight of a binder composition according to claim 14, up to about 3% by weight of an acidifying agent, up to about 15% by weight of a homopolymer, and the balance being briquette filler.

22. A process for preparing a briquette comprising the steps of:
  (i) combining briquette filler with about 1 to about 30% by weight of the binder composition of claim 1, and
  (ii) compressing the product of step (i) into a briquette.

23. The process as defined in claim 22 further comprising a step of heat curing the briquette.

24. A briquette prepared by the process of claim 23.

25. A binder composition according to claim 1, comprising from about 20% to about 60% asphalt and from about 40% to about 80% sodium carbonate pulping liquor.

26. A briquette comprising briquette filler and from about 4% to about 10% of the binder composition according to claim 25.

* * * * *